United States Patent [19]

Vogel et al.

[11] 4,336,068

[45] Jun. 22, 1982

[54] HIGH STRENGTH INSULATION MATERIALS

[75] Inventors: Edward G. Vogel, Lebanon; Rodney C. Westlund, Lancaster, both of Pa.

[73] Assignee: Lebanon Steel Foundry, Lebanon, Pa.

[21] Appl. No.: 185,745

[22] Filed: Sep. 10, 1980

Related U.S. Application Data

[60] Continuation-in-part of Ser. No. 921,595, Jul. 3, 1978, which is a continuation-in-part of Ser. No. 782,950, Mar. 30, 1977, abandoned, which is a division of Ser. No. 851,407, Nov. 14, 1977, Pat. No. 4,138,268.

[51] Int. Cl.$^3$ .............................................. C04B 19/04
[52] U.S. Cl. ................................. 106/84; 106/DIG. 2
[58] Field of Search ........................... 106/84, DIG. 2

[56] References Cited

U.S. PATENT DOCUMENTS

| | | | |
|---|---|---|---|
| 3,658,564 | 4/1972 | Gerow et al. | 106/84 |
| 3,813,253 | 5/1974 | Neises | 106/84 |
| 3,886,076 | 5/1975 | Venable | 106/DIG. 2 |

*Primary Examiner*—James Poer
*Attorney, Agent, or Firm*—Woodcock, Washburn, Kurtz, Mackiewicz & Norris

[57] ABSTRACT

Novel perlite-silicate type insulation materials are provided having improved physical strength qualities. More particularly, such materials are provided having high flexural or transverse strength as measured by A.S.T.M. standard C-203. According to a preferred embodiment, amounts of phosphate within a limited proportioned range are added to insulation mixtures to yield shaped insulating bodies having a flexural strength in excess of about 60 lb./in.$^2$. Addition of clay is made according to another preferred embodiment, whereby substantial reduction in shrinkage is accomplished.

10 Claims, 3 Drawing Figures

HIGH STRENGTH INSULATION MATERIALS

CROSS REFERENCE TO RELATED APPLICATIONS

This application is a continuation-in-part of application Ser. No. 921,595 filed July 3, 1978 which is both a continuation-in-part of application Ser. No. 782,950, filed Mar. 30, 1977, now abandoned and a division of application Ser. No. 851,407, filed Nov. 14, 1977 now U.S. Pat. No. 4,138,268.

BACKGROUND OF THE INVENTION

This invention relates to a method of making a new coherent rigid solid material particularly adapted for use as an insulating material.

Heat insulating materials are known which are prepared from fillers having at least a 75% reactive expanded perlite content and alkaline ionic silicates. Such materials are formed and cured so as to enable the perlite fraction of the filler to react with the silicate to produce a crystalline reaction product. U.S. Pat. No. 3,658,564 discloses such a material and a method of making such a material.

The material of U.S. Pat. No. 3,658,564 is made by using an extended curing period of at least three days and preferably seven to achieve relative water insensitivity. Moreover curing is accomplished under carefully controlled conditions of humidity and temperature during this period. The required curing creates some difficulties in the large scale production of the high temperature insulating material.

In addition, the material of U.S. Pat. No. 3,658,564 must be made with specific $SiO_2:K_2O$ and $SiO_2:Na_2O$ ratios in the alkaline ionic silicates. In particular, water resistive or insensitive products require $SiO_2:Na_2O$ ratios of 3:1 to 4:1 and $SiO_2:K_2O$ of 2:1 to 2.6:1 to achieve a water insensitive product. Furthermore, the material of U.S. Pat. No. 3,658,564 has a rough surface texture which is undesirable from a cosmetic standpoint. The roughness is also undesirable because of the inability to provide intricate shapes, e.g., mitre joints.

DESCRIPTION OF THE PRIOR ART

Addition of clay to certain silicate-perlite compositions is suggested by U.S. Pat. Nos. 3,321,410 issued to Mac Arthur and by 3,203,813 issued to Gajardo. No suggestion of inclusion of clay to phosphate-modified compositions is disclosed by either patent, however.

While the publication Soluble Silicates by Vail, Vol. 2, A.C.S. monograph No. 116, Rheinhold p. 398–413, proposes the addition of phosphates to basic or neutral refractories, Vail does not appreciate and, accordingly does not disclose the limited ranges of phosphate suitable for addition to silicate-perlite composition according to the present invention. Neither does the Vail reference recognize the significant improvement in transverse strength of the shaped bodies which may be accomplished by the addition of phosphate to silicate-perlite compositions within the critical ranges taught herein.

SUMMARY OF THE INVENTION

It is a purpose of the invention to provide a method of making a material which is especially useful as heat insulating material. A further purpose is to provide a method of making such a material which is at once practical and reasonably economical and has especially good strength, low bulk density, low thermal conductivity, and good dimensional stability. Another purpose is to provide insulating material having flexural strengths greater than about 58 lb./in.$^2$, and preferably greater than about 60 lb./in$^2$. It is also a purpose to provide a method of making a material which has a relatively smooth and cosmetically pleasing texture. A furtherr purpose is to provide a method of making such a material which has expanded perlite as a major constituent. A further purpose is to provide a method of making such a material which has relatively good water resistivity, that is, ability to maintain shape and weight and reasonable strength in the face of exposure to water, and even better resistivity as to oil, has a corrosion inhibition property in the presence of such things as chlorides and chlorine, and resistivity to surface burning. A further purpose is to provide a method of making such a material which can be made by a practical, economical and effective process.

In accordance with these and other purposes of the invention, the process of making a coherent rigid solid material comprises the steps of first mixing the following parts by weight: expanded perlite from about 20 through about 50 parts; from about 9.5 to about 19 parts of sodium silicate or potassium silicate in the form of an aqueous solution thereof; an amount sufficient to improve the transverse strength of said material of a phosphate, said phosphate being substantially soluble in said aqueous solution, and from about 21 to about 67 parts of water, including that found in said aqueous solution. Thereafter, the mixture is subjected to heat as a result of which there is no longer the original content of water.

In a preferred embodiment, the material may be compressed or blown into shape between mixing and subjecting to heat. Compression may, for example, be done under vibration with compression being performed in one or a plurality of steps in which only part of the materials is compressed at one time.

The materials may be mixed by bringing together expanded perlite and the phosphate as dry materials, adding a slurry including sodium or potassium silicate, and water and mixing until the mixture appears damp and dust free but short of time when the mixture begins to substantially shrink. The mixture is then compressed or blown into shape before subjecting to heat. In the preferred embodiments of the invention, the mixture may be subjected to heat in a hot air oven in a range from 93° C. to 99° C. with 96° C. preferred. In the alternative, the mixture may be subjected to heat by a microwave heating means.

In a preferred embodiment, an organic or inorganic fiber material may also be mixed with the materials. Preferably, the fiber material is from a class comprising fiberglass, heat resistant nylon, mineral wood, and netting; from about 0.5 to about 3 parts by weight are usually preferred.

In accordance with another preferred embodiment of the invention, a clay is included in the formulation. Preferred clays of such inclusion include Bentonite, Kaolin and similar species with Kaolin being preferred. In general, amounts of clay weighing from about 20% to about 25% of the total weight of sodium or potassium silicate solids together with the clay are employed. Amounts of clay weighing from about 21% to about 24% of the silicate are preferred. The clay is preferably added together with the dry ingredients and has been found significantly to reduce shrinkage in the resulting insulating materials.

Another preferred embodiment employs certain types of expanded perlite to yield solid materials of improved strength (as a factor of weight) and heat transmission qualities. Thus, a preferred formulation employs perlite having a low density (below about 2.5 pounds per cubic foot).

Still more preferred embodiments employ combination of the above. Thus, a mixture may be formulated comprising low density perlite, silicate, phosphate, water, fibers, and Kaolin clay within the above referenced proportions to yield solid materials of particularly excellent properties, especially transverse strength and heat insulating properties.

In a preferred method, the material is formed by compressing or blowing the material into separable segments comprising mating tongues and grooves. According to a more preferred embodiment, "core blowing," which is the process of molding employing air flow for bulk material transport, is practiced.

DETAILED DESCRIPTION OF PREFERRED EMBODIMENTS

Figure 1:
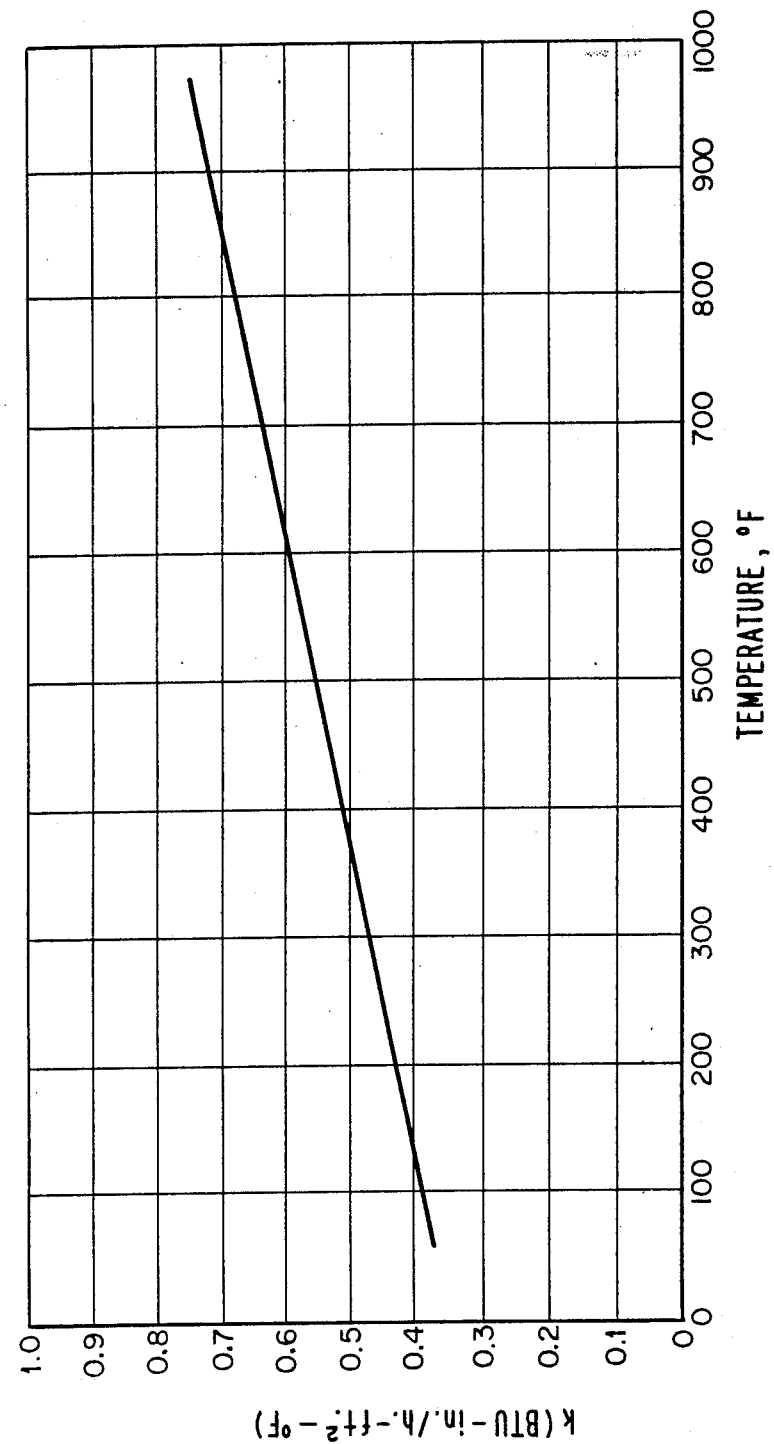
FIG. 1 is a diagram illustrating the thermal conductivity of the material of the invention.
Figure 2:
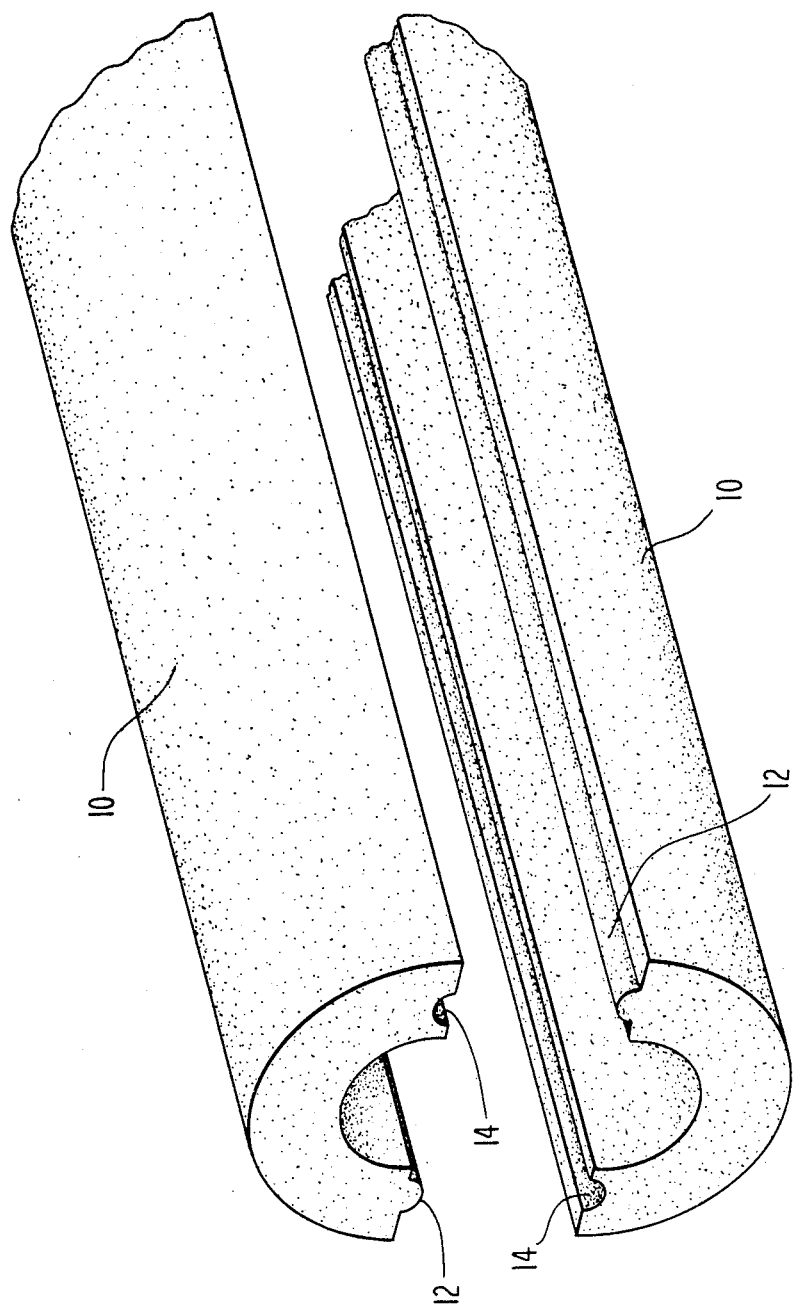
FIG. 2 is an exploded perspective view of the material of this invention, 10, formed into hollow tubular configuration with tongues, 12, and grooves, 14.

The material of the present invention starts out ultimately as a mix of the following by weight:

expanded perlite from about 20 through about 50 parts, preferably 29 through 45 parts, with 36 through 42 representing an optimum;

sodium silicate or potassium silicate as an aqueous solution including 9.5 through 19 parts, preferably 11.5 through 18 parts, solids content of sodium or potassium silicate with 14.5 through 16.5 representing the optimum;

an amount sufficient to improve the transverse strength of a phosphate, said phosphate being substantially soluble in the aqueous silicate, with from 0.05% to about 5% and especially from about 0.1% to about 2% being preferred;

water, to make a total of water, including any that may be associated with the sodium silicate, of 21 through 67 parts, preferably 26 through 57, with 32 through 42 representing the optimum.

Optionally, the mixture may include a clay in an amount of from about 20% to about 25% and more preferably from about 21% to about 24% of the total weight of the silicate solids and the clay. Additionally, fibrous materials may be added in amounts ranging from about 0.5 to about 3 parts by weight. The perlite may, preferably, be of low density, it may have a density below about 2.5 pounds per cubic foot.

The mixture may be obtained by mixing the expanded perlite, the clay and the fibrous material together in solid form and separately mixing the sodium or potassium silicate in a solution of preferably from about 35° to about 43° Baume with from about 36° to about 41° being preferred. This liquid mixture is, in turn, mixed in with the powder. The mixing is then continued up at least to the time the mix appears damp and dust-free, but not up to the time the mix starts to shrink substantially and to compact. Silicate solutions having a lesser gravity tend to form watery products, while use of higher gravity solutions tends to deflate the mixtures prior to shaping, and tends to give products of poor strength.

Various mixing devices, such as a planetary batch mixer, or a continuous screw feed mixer, are suitable for the mixing, a pug mill batch mixer also being suitable. A mixer known as a "Patterson-Kelly Cross-Flow" TM mixer is preferred.

The material is then compressed by a ram or by vibration, into the shape in which it will ultimately be wanted. Another less preferred way of bringing it into shape is to put part of the material into a mold or the like, compress that part and then put in part or all of the additional material, compress it, and so on.

The shaped material is then heated to cure it, this being preferably done in a microwave oven. A conventional oven utilizing hot air may also be employed. According to a preferred embodiment, the shaped material may be cured by exposing it preferably while still in the mold, to heated carbon dioxide gas in a fashion well-known to those skilled in the foundry art. Alternatively, the body while still in the mold, may be heated, or the body may be placed on a heated surface to effect cure. Any means whereby a curing or "setting" of the shaped body into a rigid article is suitable, and all are forseen hereby. Similarly, any temperature which is sufficient to cause curing is suitable. For example, use of $CO_2$ gas heated to about 450° F. for up to about 30 minutes works well for moderate sized articles.

The fiber material may comprise a class of organic or inorganic materials incuding figerglass. A heat resistant nylon-type fibrous material, such as poly (1,3-phenylene isophthalamide), sold commercially under the tradename Nomex, can be used as may fiberglass. A preferred fiber is a member of the class of polyesters. Less preferably, mineral wool, such as rockwool; cotton or wood fibers may also be used. The amount of fiberous material may range from about 0.5 parts to about 3 parts by weight. The fiberglass or other fibrous material is in the form of a floc—that is, a set of fibers having short lengths, averaging preferably $\frac{1}{8}$ through $\frac{1}{4}$ inches long and most preferably averaging about $\frac{1}{4}$ inches long.

The class of fiber material may also include netting which may be organic or inorganic materials including polypropylene, polyester, nylon or Dacron. The netting comprises fibers of a thickness in the range of 0.007 to 0.125 inches, openings having areas in the range of 0.06 to 1 square inch and weight of less than 2 lbs. per thousand square feet. The netting strength should exceed 4 grams per denier when subjected to an Instron tester at 65% relative humidity. The openings in the netting may take on a variety of shapes including squares, rectangles, circles or ovals. All fiber materials must be stable at temperatures in excess of 250° F., i.e., there is no substantial softening below these temperatures.

The expanded perlite should have a dry bulk density of 2 through 8 lbs. per cubic foot, preferably less than about $3\frac{1}{2}$ lbs. per cubic foot, and even more preferably below about $2\frac{1}{2}$ lbs. per cubic foot. The perlite is a complex sodium potassium aluminum silicate volcanic granular glass. Its screen sizing should be AFS (American Foundry Society) average screen size designation of 70 through 120 and preferably 110. A perlite with 25% maximum contaminants including no more than 0.5% each of Fe of Ca and no more than 0.1% of each of arsenic, barium, beryllium, boron, chlorine, chromium, copper, gallium, lead, manganese, molybdenum, nickel, sulphur, titanium, yttrium and zirconium is most suitable. Expanded perlite includes all perlite made from naturally occurring perlite sand which is expanded by heat. The fusion temperature is in excess of 2300° F. and has a solubility of less than 1% in water, less than 10% in 1 N NaOH and less than 3% in mineral acids.

The sodium or potassium silicate should become part of the mix in the form of a water solution capable of being handled in a practical manner. Any commercially available solution will suffice but it is preferred that its ratio of silicon dioxide to sodium oxide should be in the range of 3:1 to 1 through 3.4 to 1, and most preferably about 3.22 to 1, and it should have a solids content preferably in the range of 36% through 44%, and most preferably about 38%. An example of a suitable sodium silicate grade to use is the N grade sold by Philadelphia Quartz. Where potassium silicate is used, the ratio of silicon dioxide to potassium oxide should preferably be in the range of 2.0 to 1 through 2.7 to 1 with a solids content of 24 to 35%. For best fabrication, the silicate should have a specific gravity of from about 35° to about 43° Baume and preferably from about 36° to about 41° Baume.

The clays suitable for inclusion in the mixtures of this invention include a wide variety of hydrated aluminum silicates having irregularly shaped crystals and being capable of absorbing water to form a plastic, moldable, mass or thixotropic gel. Of these, Bentonite and Kaolin are preferred with Kaolin being most preferred. It has been found that amounts of clay equal in weight to about 20% to about 25% and more preferably from about 21% to about 24% of the total weight of the silicate together with the clay is suitable.

The phosphates useful for the practice of the invention are quite broad in scope. Any phosphate which is substantially water soluble at modest temperatures may be so employed. More particularly, it is convenient to utilize such phosphates which are soluble in the aqueous silicate solutions used in the practice of the invention. Of the many phosphates which are, thus, suitable, the mono-, di-, and trisodium and potassium phosphates are both suitable and commercially accessable, and hence, are preferred. All other water soluble phosphates are similarly suitable, however. The phosphates may be employed in the embodiments of this invention in amounts ranging from about 0.05% to about 5% by weight of the mixture with about 0.1% to about 2.0% being most preferred.

The addition of soluble phosphate to the mixtures of this invention results in substantial increases in the transverse strength of the resulting solid materials. In actual experience, the addition of from 0.1% to about 2.0% by weight of such phosphate increases the transverse strength from about 10 to 20%. This very substantial increase in strength does not continue with increasing phosphate loading. Thus, amounts over about 2.0% tend to decrease the transverse strength characteristics. More preferably, amounts of phosphate from about 0.3% to about 1.5% have been demonstrated to improve the transverse strength (also called flexural strength) of the resulting insulating material to a surprising degree. Indeed, flexural strengths in excess of about 57 lb./in.$^2$ may be demonstrated in such materials which include phosphate within the critical range. Inclusion of about 0.4% phosphate results in a flexural strength of over 60 lb./in.$^2$, an extremely high value, while retaining good insulation qualities.

The curing or drying step, can well take place in an oven, for example in an electric or other conventional oven with air circulating within it. In such a case, the piece of material being subjected to the heating should be so supported that the maximum area of the piece will have direct access to the air in the oven. For example, a piece with relatively longer and shorter dimensions should be supported with its longest dimension in the vertical direction, which will achieve this result and also tend to prevent warping. Dehydrating and otherwise curing the material can also be accomplished by the use of microwave energy in heating devices such as ovens, which have a capability of securing the result in a much shorter time, for example for some time such as 5 minutes to the inch of minimum dimension or maximum thickness. Use of this has been found on the average to enhance the strength more than 20% as compared to using a conventional oven.

A preferred embodiment employs the injection of carbon dioxide gas heated to an elevated temperature into the mold wherein is held the shaped body. A temperature of about 450° for the $CO_2$ has been found to be useful with an exposure time of about 30 seconds. Alternatively, the body may be heated conductively either by placing the mold containing the shaped body in an oven or by placing the body on a heated surface. Temperatures of about 450° F. oven times of about 30 minutes to two hours have been shown to be useful for moderately sized articles. Employment of carbon dioxide is preferred due to the fact that the resulting insulating materials exhibit particularly good resistance to attack by moisture. Such resistance is particularly beneficial in such insulative compositions.

The following examples are intended as merely illustrative and should not be construed as being limiting. Those skilled in the art will recognize that this invention may be employed to formulate a wide range of novel insultaing compositions.

EXAMPLE 1

Figure 3:
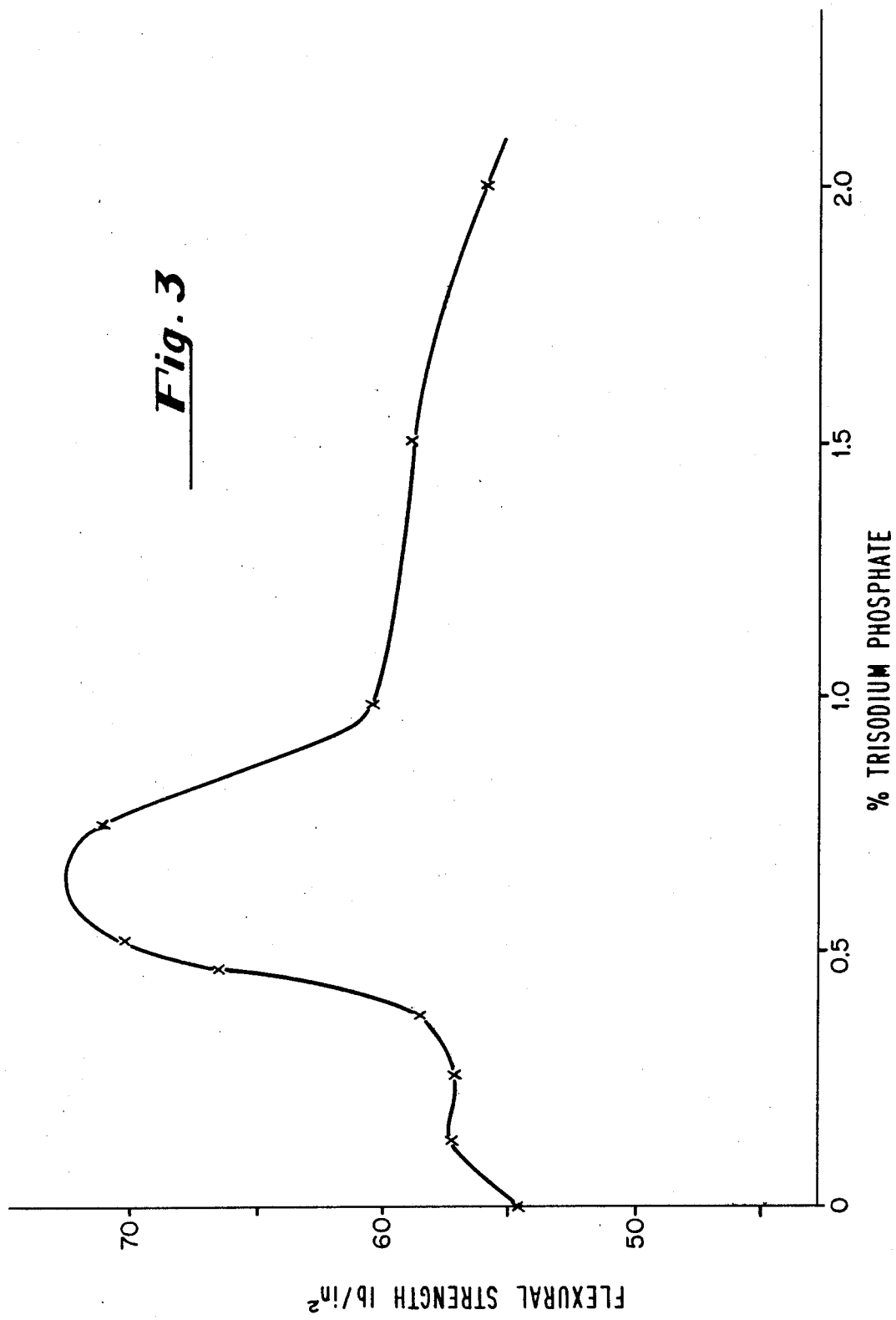
FIG. 3 is a diagram illustrating the dependence of transverse strength upon phosphate concentration in the compositions of the invention.

Expanded perlite having a bulk density of 2.3 lb./ft.$^3$ (0.89 lb.), 0.334 lb. of Kaolin clay, and 0.034 lb. of polyester fibers were mixed together. Sodium silicate (N-grade of PQ Corp.), 1.10 lb. was separately mixed with 50 ml of water (0.110 lb.) and varying amounts of trisodium phosphate. The aqueous solution was then mixed with the solids until a dustless condition was evidenced. The mixtures were press-formed into blocks having dimensions of 12"×12"×1½". These were exposed to $CO_2$ gas at 45 psi for 10 seconds and cured in a microwave at 13 k.w. for 10 minutes or until thoroughly dry. These blocks were tested according to A.S.T.M. Standard C-203 "Breaking Load and Calculated Flexural Strength of Pre-Formed Block Type Thermal Insulation". The data this collected is reproduced below and presented graphically in FIG. 3.

| gms. | Phosphate % | Breaking Load (lb.) | Flexural Strength (lb./in.) |
|---|---|---|---|
| 0.0 | 0.0 | 24.5 | 54.44 |
| 1.19 | .12 | 25.8 | 57.33 |
| 2.5 | .24 | 25.5 | 56.67 |
| 3.5 | .32 | 26.1 | 58.00 |
| 4.76 | .40 | 29.8 | 66.22 |
| 5.95 | .52 | 31.62 | 70.27 |
| 8.92 | .76 | 32.00 | 71.11 |

-continued

| gms. | Phosphate % | Breaking Load (lb.) | Flexural Strength (lb./in.) |
|---|---|---|---|
| 11.90 | 1.04 | 27.1 | 60.22 |
| 17.85 | 1.55 | 26.6 | 59.11 |
| 23.80 | 2.06 | 25.8 | 57.33 |

This example demonstrates the criticality of employing phosphate in a limited range. More particularly, the increase in flexural strength of perlite-silicate insulation materials provided by the addition of phosphate is demonstrated to be dependent upon a critical range of phosphate concentration.

EXAMPLE 2

The procedure of Example 1 was used to construct 8 inch square and round shapes for determination of thermal conductivity. The following composition was employed:

| Perlite | 0.9 lb. |
|---|---|
| N-Grade Silicate | 0.82 lb. |
| Fibers | 0.0157 lb. |
| Kaolin | 0.1752 lb. |
| Trisodium Phosphate | 0.010 lb. (0.4%) |
| Water | 0.270 lb. |

The thermal conductivity is illustrated in FIG. 1.

What is claimed is:

1. A coherent, rigid, solid material made from a mixture said mixture comprising by weight a. from about 20 to about 50 parts of expanded perlite,
b. from about 9.5 to about 19 parts of sodium or potassium silicate in the form of an aqueous solution thereof,
c. an amount sufficient to improve the transverse strength of said solid material, of a phosphate, said phosphate being capable of substantially dissolving in said aqueous solution, said amount being between about 0.05% and about 5.0% by weight of said mixture and;
d. from about 21 to about 67 parts of water, including that found in said aqueous solution.

2. The material of claim 1 further comprising an amount equal to from about 20% to about 25% of the total weight taken together with said silicate of a clay.

3. The material of claim 2 wherein said clay is Kaolin.

4. The material of claim 1 further comprising from about 0.5 to about 3 parts of fiberous material.

5. The material of claim 4 wherein said fiberous material is a polyester.

6. The material of claim 1, 2, 3, 4 or 5 wherein said phosphate is selected from the group consisting of mono-, di-, and tri-sodium or potassium phosphate and mixtures thereof.

7. The material of claim 1 wherein said phosphate is present in an amount of from about 0.1% to about 2%.

8. The material of claim 1 wherein said phosphate is present in an amount of from about 0.3% to about 1.5%.

9. The material of claim 1 which has been formed into a shaped body.

10. The material of claim 1 having a flexural strength in excess of 60 lb/in$^2$.

* * * * *

UNITED STATES PATENT AND TRADEMARK OFFICE
CERTIFICATE OF CORRECTION

PATENT NO. : 4,336,068
DATED : June 22, 1982
INVENTOR(S) : Edward G. Vogel et al.

It is certified that error appears in the above-identified patent and that said Letters Patent are hereby corrected as shown below:

Column 5, line 14, change "3:1" to --3.1--.

Signed and Sealed this

Fourteenth Day of September 1982

[SEAL]

Attest:

GERALD J. MOSSINGHOFF

*Attesting Officer*     *Commissioner of Patents and Trademarks*